(12) United States Patent
Endo et al.

(10) Patent No.: US 7,400,947 B2
(45) Date of Patent: Jul. 15, 2008

(54) SEAT STATUS DETECTING DEVICE

(75) Inventors: Hirofumi Endo, Toyota (JP); Yoshitaka Koga, Chiryu (JP); Satoru Tagawa, Takahama (JP); Yasuhiro Kojima, Kariya (JP); Mikihito Nagura, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 724 days.

(21) Appl. No.: 10/894,119

(22) Filed: Jul. 20, 2004

(65) Prior Publication Data

US 2005/0021207 A1 Jan. 27, 2005

(30) Foreign Application Priority Data

Jul. 22, 2003 (JP) ............................. 2003-199798

(51) Int. Cl.
*B60N 2/06* (2006.01)

(52) U.S. Cl. .......................................................... 701/1
(58) Field of Classification Search ........................ None
See application file for complete search history.

(56) References Cited

U.S. PATENT DOCUMENTS

| | | | |
|---|---|---|---|
| 5,556,288 A | 9/1996 | Ishii et al. | |
| 6,053,529 A | 4/2000 | Frusti et al. | |
| 6,561,544 B1 * | 5/2003 | Clancy et al. | 280/735 |
| 6,774,625 B2 * | 8/2004 | Suzuki et al. | 324/207.24 |
| 6,798,196 B2 | 9/2004 | Kojima et al. | |
| 6,935,692 B2 * | 8/2005 | Nishide et al. | 297/344.11 |
| 7,009,386 B2 * | 3/2006 | Tromblee et al. | 324/207.2 |
| 7,147,261 B2 * | 12/2006 | Ventura et al. | 296/65.13 |
| 7,195,261 B2 * | 3/2007 | Yoshida et al. | 280/735 |
| 2002/0145418 A1 * | 10/2002 | Becker | 324/207.2 |
| 2002/0190874 A1 * | 12/2002 | Tokunaga et al. | 341/15 |
| 2003/0117000 A1 * | 6/2003 | Barnabo et al. | 297/217.1 |
| 2004/0004474 A1 | 1/2004 | Kojima et al. | |
| 2004/0196029 A1 * | 10/2004 | Okumura et al. | 324/207.24 |

FOREIGN PATENT DOCUMENTS

| | | |
|---|---|---|
| JP | 4-023046 U | 2/1992 |
| JP | 5-048244 U | 6/1993 |
| JP | 7-260408 A | 10/1995 |
| JP | 10-274547 A | 10/1998 |
| JP | 2002-200933 | 7/2002 |
| JP | 2003-337004 A | 11/2003 |

* cited by examiner

*Primary Examiner*—Michael J. Zanelli
(74) *Attorney, Agent, or Firm*—Buchanan Ingersoll & Rooney PC

(57) ABSTRACT

A seat status detecting device includes a seat status detecting device includes a seat slide portion provided at a seat, a magnetic sensor provided at the seat slide portion for detecting a seat status, and a protective cover assembled to the magnetic sensor for surrounding the magnetic sensor.

8 Claims, 7 Drawing Sheets

SEAT STATUS DETECTING DEVICE

CROSS REFERENCE TO RELATED APPLICATIONS

This application is based on and claims priority under 35 U.S.C. § 119 to Japanese Patent Application 2003-199798, filed on Jul. 22, 2003, the entire content of which is incorporated herein by reference.

FIELD OF THE INVENTION

This invention generally relates to a seat status detecting device.

BACKGROUND

It is known to equip a vehicle such as a passenger car with an air bag for protecting a vehicle occupant. In case of deploying the air bag with a predetermined operation force in order to protect the vehicle occupant, an appropriate effect may not be obtained due to a seat status such as a seat position (i.e. occupant position in the vehicle). Thus, it has been proposed to switch the operation force of the air bag in response to the seat status when the air bag is deployed. A vehicle seat equipped with a seat status detecting device for detecting the seat status is also known.

Such seat status detecting device is disclosed in U.S. Pat. No. 6,053,529. The disclosed seat status detecting device includes a magnetic sensor mounted to a stationary rail of a seat slide portion via a support member, and a detected plate (flange) mounted to a movable rail of the seat slide portion. The magnetic sensor is operative to sense the seat position with respect to two zones. The magnetic sensor generates a signal as a seat position detection signal in response to the position of the detected plate with respect to two zones. Then, the seat status detecting device detects the seat position based on the seat position detection signal generated by the magnetic sensor.

According to the above-mentioned seat status detecting device, the support member and the detected plate are employed for mounting the magnetic sensor to the stationary rail. In addition, a space formed along the stationary rail and the movable rail by the magnetic sensor and the detected plate is a dead space, thereby deteriorating the mounting performance of the magnetic sensor.

In order to prevent an increase of number of parts and improve the mounting performance of the magnetic sensor, a known seat status detecting device is disclosed in Japanese Patent Laid-Open Publication No. 2002-200933. According to the disclosed seat status detecting device, a magnetic sensor is mounted to an upper rail (movable rail) for detecting a lower rail (stationary rail) so as to detect the seat position.

Both seat status detecting devices mentioned above detect the seat position by a magnetic member (detected plate or stationary rail) such as a steel plate approaching the magnetic sensor. Therefore, if a foreign object of magnetic member such as an iron piece and magnet that the occupant has brought into the vehicle attaches to the magnetic sensor, the detection performance thereof may deteriorate.

Thus, a need exists for a seat status detecting device that can prevent the detection performance of a magnetic sensor from deteriorating caused by a foreign object of magnetic member attaching to the magnetic sensor.

SUMMARY OF THE INVENTION

According to an aspect of the present invention, a seat status detecting device includes a seat slide portion provided at a seat, a magnetic sensor provided at the seat slide portion for detecting a seat status, and a protective cover assembled to the magnetic sensor for surrounding the magnetic sensor.

According to another aspect of the present invention, a seat status detecting device includes a seat slide portion provided at a seat, and a magnetic sensor provided at the seat slide portion for detecting a seat status. The magnetic sensor is arranged to be covered by a shield cover as a decorative part.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1A:
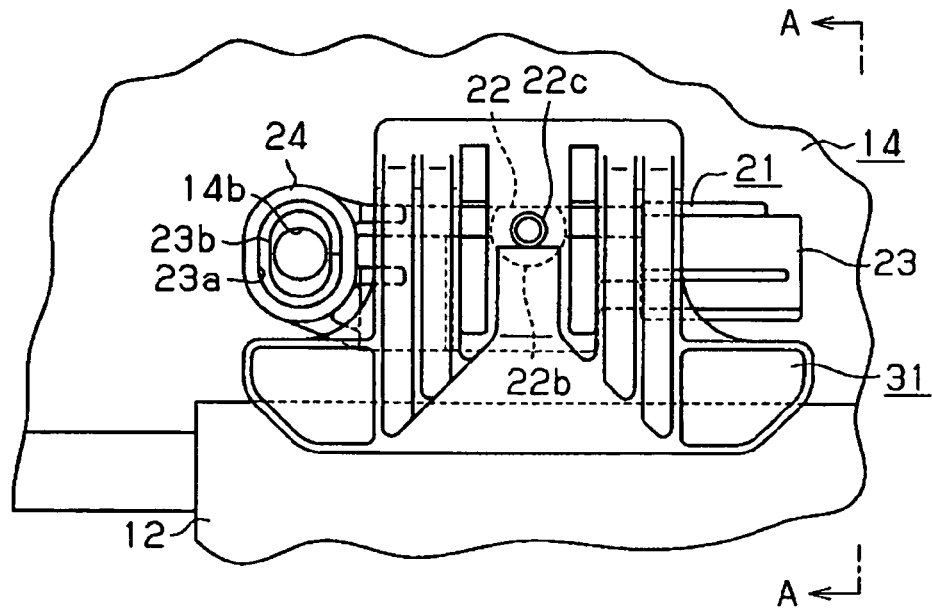
FIG. 1A is a side view of a seat slide portion according to an embodiment of the present invention.
Figure 1B:
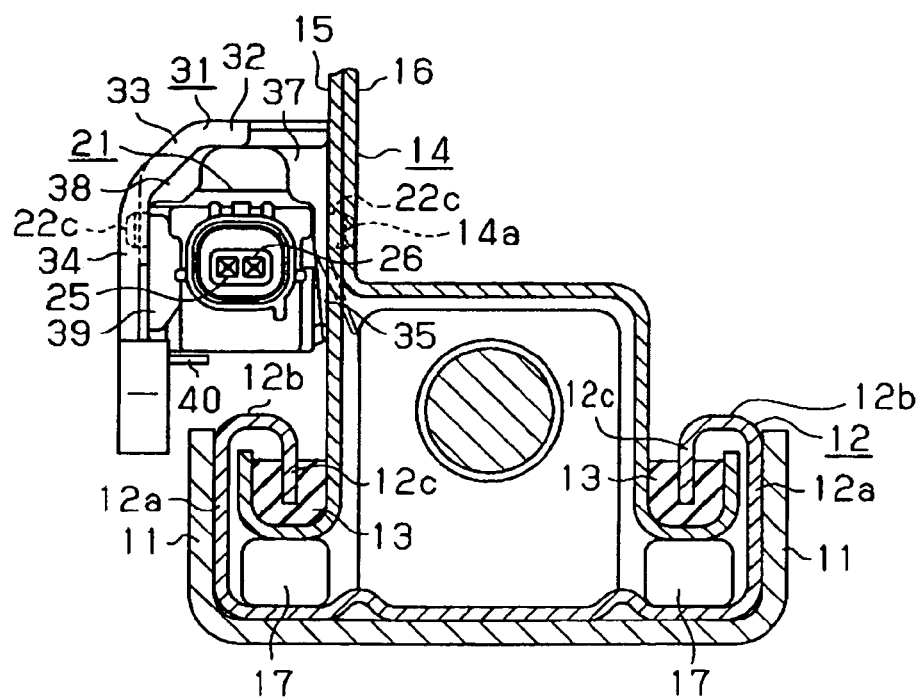
FIG. 1B is a cross-sectional view taken along the line A-A of FIG. 1A.

An embodiment of the present invention is explained referring to attached drawings. FIG. 1A is a side view especially showing a seat slide portion provided at a vehicle seat. FIG. 1B is a cross-sectional view taken along the line A-A of FIG. 1A. A pair of seat slide portions are provided on both sides of the vehicle seat for adjusting a seat position in a longitudinal direction of the vehicle. One of the pair of seat slide portions is explained in the following.

As shown in FIG. 1A, the seat slide portion includes a supporting frame 11 having a substantially U-shaped cross section and fixed to a vehicle floor (not shown) along the vehicle longitudinal direction. A lower rail 12 made of steel plate is supported and fixed along the supporting frame 11. The lower rail 12 includes an outer wall face substantially along an inner wall face of the supporting frame 11 to thereby form a substantially U-shaped cross section. End portions of respective sidewall portions 12a formed along respective sidewall portions of the supporting frame 11 are folded back substantially in parallel with the sidewall portions 12a via respective winding portions 12b bending gently inwardly in a direction in which the winding portions 12b face each other. Rubber members 13 are assembled to the respective end portions, i.e. fold-back portions 12c, of the lower rail 12.

The seat slide portion further includes an upper rail 14 made of steel plate and being slidable relative to the lower rail 12 in the vehicle longitudinal direction. Precisely, the upper rail 14 includes two frames 15 and 16 extending substantially in parallel with the sidewall portions 12a of the lower rail 12, and connected to each other until the middle portion and then separated from each other at each end side. Both end portions of the frames 15 and 16 are outwardly folded back in opposite directions to each other so as to surround the respective rubber members 13 assembled to the lower rail 12 (fold-back portions 12c). In addition, the frames 15 and 16 of the upper rail 14 are slidably supported on respective supporting blocks 17 fixed to a bottom wall portion of the lower rail 12 facing the rubber members 13. Accordingly, the upper rail 14 is slidable relative to the lower rail 12 via the respective end portions of the frames 15 and 16, being guided by the rubber members 13.

A sensor 21 of a magnetic type is formed on the upper rail 14 for detecting a seat position in the vehicle longitudinal direction. The sensor 21 is mounted on the upper rail 14 such that a lower face of the sensor 21 when viewed from a front side is positioned apart from the bending portion 12b, keeping a predetermined distance therebetween as shown in FIG. 1B. The sensor 21 is provided on only one of the pair of seat slide portions.

The sensor 21 includes a holder portion 22 for accommodating a magnetic force detecting portion (to be mentioned later), a connector portion 23 continuously formed on one side of the holder portion 22 (right side of FIG. 1A) and a sensor fitting portion 24 continuously formed on the other side of the holder portion 22 (left side of FIG. 1A). The outline of the magnetic sensor 21 is integrally formed by resin material. As shown in FIG. 1B, the sensor 21 has a substantially symmetrical structure in width direction thereof (horizontal direction of FIG. 1B) so that the sensor 21 can be assembled to either of the pair of seat slide portions (upper rail 14).

Figure 2A:
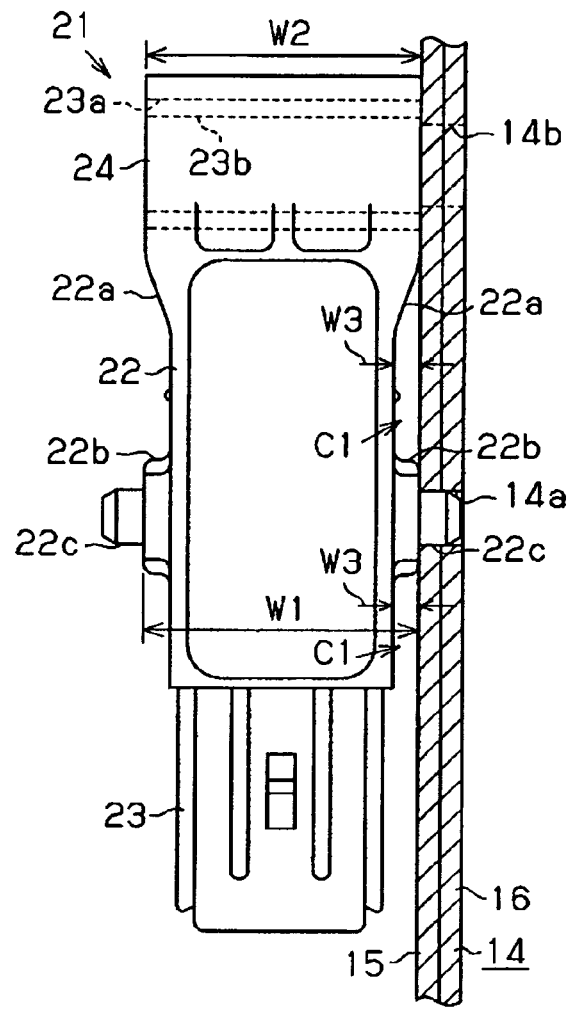
FIG. 2A is a plane view of a sensor in a mounted state according to the embodiment of the present invention.

Precisely, as shown in FIG. 2A of a plain view of the sensor 21, the holder portion 22 is gradually narrowed relative to the sensor fitting portion 24 via each inclined face 22a. A pair of seat portions 22b are formed on a center portion in the vehicle longitudinal direction (vertical direction of FIG. 2A) of both sides of the sensor 21, being raised in the width direction thereof (horizontal direction of FIG. 2A) into a substantially cylindrical shape. In addition, the pair of seat portions 22b are formed on an upper side of the sensor 21 (i.e. upper side of FIG. 1A or 1B). A width W1 between tip end faces of the pair of seat portions 22b is equal to a width W2 of the sensor fitting portion 24. A pair of positioning pins 22c are formed on center portions of the respective seat portions 22b, extending in the width direction therefrom. The symmetrical positioning pins 22c are provided for positioning the sensor 21 relative to the upper rail 14 that is selectively arranged on either side in the width direction of the sensor 21.

The upper rail 14 includes a positioning hole 14a corresponding to the positioning pin 22c of the sensor 21. The positioning pin 22c is inserted into the positioning hole 14a until a side face of the sensor fitting portion 24 and the tip end face of the seat portion 22b both facing the upper rail 14 become in contact with a plane of the upper rail 14 facing the sensor 21, thereby locating the sensor 21 at a predetermined fitting position of the upper rail 14. At this time, gaps C1 each having a width W3 are formed on both sides of the seat portion 22b in the longitudinal direction and between a side face of the holder portion 22 and the plane of the upper rail 4 facing each other.

Figure 2B:
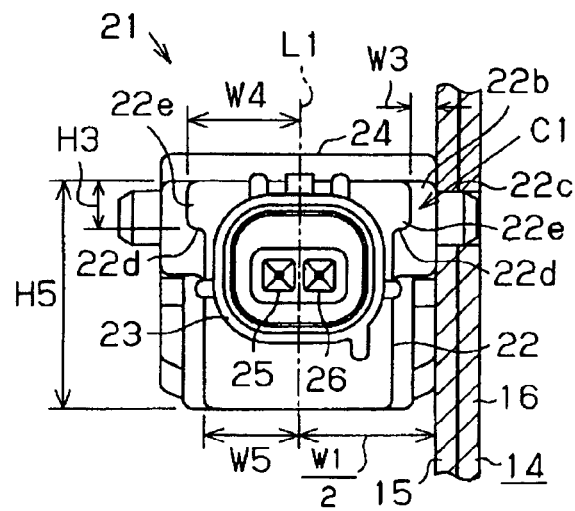
FIG. 2B is a front view of the sensor in the mounted state according to the embodiment of the present invention.

As shown in FIG. 2B, the holder portion 22 is narrowed towards lower side thereof (i.e. lower side of FIG. 2B) in the width direction via each stepped portion 22d. That is, a land portion 22e is formed on the upper side of the holder portion 22, being raised into a strip shape in the width direction along the upper face of the holder portion 22. A relationship between a width W4 defined between a side face on the upper side of the holder portion 22, i.e. upper side relative to the stepped portion 22d, and a symmetrical line L1 in the width direction of the sensor 21, and a width W5 defined between a side face on the lower side of the holder portion 22, i.e. lower side relative to the stepped portion 22d, and the symmetrical line L1 is represented as W4>W5.

As shown in FIG. 2B, the connector portion 23 surrounds connecting terminals 25 and 26 extending from the magnetic force detecting portion and to which an external connector connected to the sensor 21 is attached. As shown in FIGS. 1A and 2A, the sensor fitting portion 24 includes a bolt inserting bore 23a having a substantially flat circular shaped cross section extending in the vertical direction. A bush 23b is disposed into the bolt inserting bore 23a. The upper rail 14 includes a bolt inserting bore 14b corresponding to the bolt inserting bore 23a of the sensor fitting portion 24. In addition, a weld nut (not shown) is welded to the upper rail 14 on the opposite side to the sensor 22, being coaxial with the bolt inserting bore 14b. The sensor 21 is fixed to the upper rail 14 by a bolt (not shown) positioned within the bolt inserting bore 23a and the bolt inserting bore 14b to be tightened to the weld nut. The bolt inserting bore 23a has the substantially flat circular shape in section extending in the vertical direction so that variation of products may be absorbed by mainly the positioning pin 22c that adjusts the fitting position of the sensor 21. In addition, in the process of tightening the bolt to the weld nut, the sensor 21 is prevented from moving along with the movement of the bolt because of the positioning pin 22c positioned within the positioning hole 14a.

As mentioned above, the sensor 21 has a symmetrical structure. Thus, as shown in FIGS. 2A and 2B, when the sensor 21 is being positioned relative to the upper rail 14 by using one of the positioning pins 22c provided on one side of the sensor 21 (i.e. right side of FIGS. 2A and 2B), the other one of the positioning pins 22c on the other side of the sensor 21 (i.e. left side of FIGS. 2A and 2B) remains extending in the width direction. In this case, if the sensor 22 is being positioned by using the other one of positioning pins 22c on the other side of the sensor 21, the one of the positioning pins 22c on the one side of the sensor 21 remains extending in the width direction.

As shown in FIG. 1B, a protective cover 31 made of resin material is assembled to the sensor 21 that is mounted to the upper rail 14, covering mainly the holder portion 22, i.e. the upper face and the outer face thereof provided on opposite side to the upper rail 14.

Figure 3A:
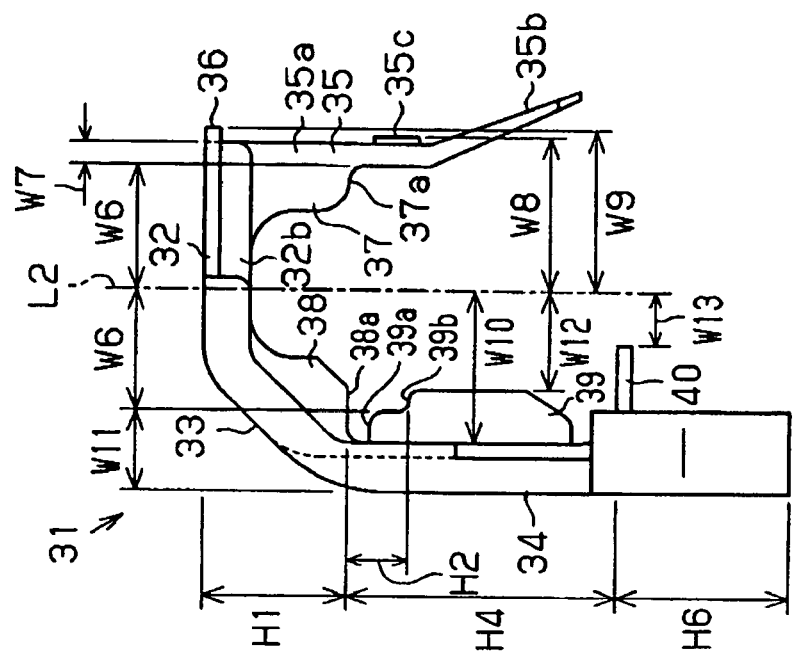
FIG. 3A is a plane view of a protective cover according to the embodiment of the present invention.
Figure 3B:
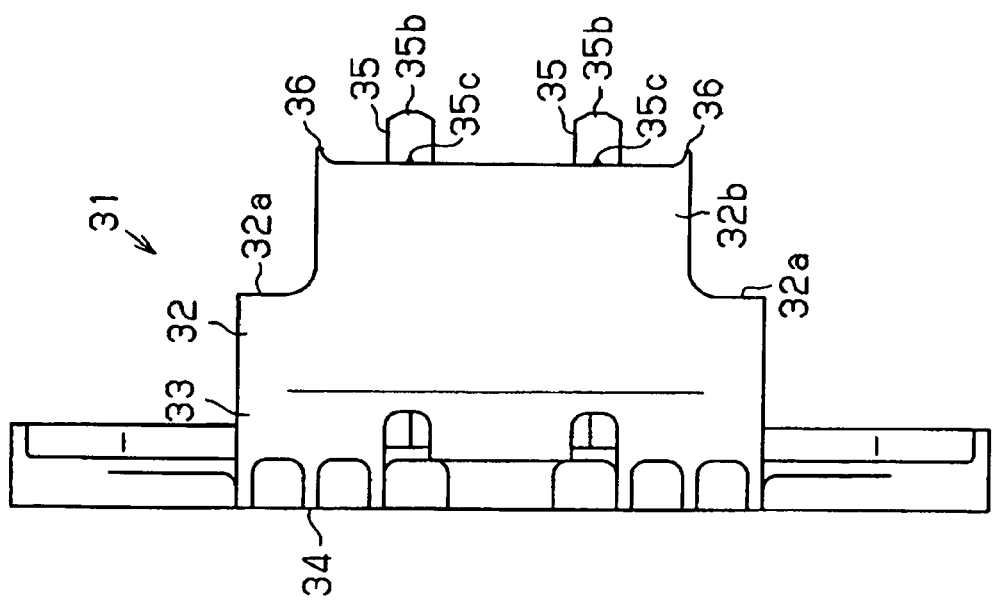
FIG. 3B is a front view of the protective cover according to the embodiment of the present invention.

As shown in FIGS. 3A and 3B, the protective cover 31 having a substantially L-shape includes a top board portion 32, an inclined board portion 32 and inclining downwardly therefrom, and a sidewall portion 34 connected to the inclined board portion 33 and further inclining so as to be substantially perpendicular to the top board portion 32. As shown in FIGS. 1A and 3A, the protective cover 31 has a substantially symmetrical structure in the longitudinal direction (horizontal direction of FIG. 1A, and vertical direction of FIG. 3A) so that the protective cover 31 can be assembled to the sensor 21 that is mounted to either of the pair of seat slide portions (upper rail 14).

The top board portion 32 is slightly longer than the holder portion 22 of the sensor 21 in the longitudinal direction (vertical direction of FIG. 3A) as shown in FIG. 3A. An end side of the top board portion 32 (right side of FIG. 3A) is narrowed via each stepped portion 32a. Then, a plurality of engaging hooks 35 (two engaging hooks according to the present embodiment) are formed on an end portion of a reduced width portion 32b, extending in a direction substantially perpendicular to the reduced width portion 32b (i.e. substantially in parallel with the sidewall portion 34) with keeping a predetermined distance.

The engaging hooks 35 are provided so as to be positioned corresponding to the respective gaps C1 formed on both sides of the seat portion 22b in the longitudinal direction when the protective cover 31 is assembled to the sensor 21 that is mounted to the upper rail 14. As shown in FIG. 3B, each engaging hook 35 includes an arm portion 35a extending substantially in parallel with the sidewall portion 34, and a hook portion 35b extending and bending from a lower end of the arm portion 35a in an obliquely outward direction, i.e. towards the upper rail 14 side. A width W6 from a reference line L2 of the protective cover 31 to an inner side face of the arm portion 35a is slightly larger than the width W4 defined on the upper side of the holder portion 22 in FIG. 2B. The reference line L2 is a line defined on the protective cover 3 by the symmetrical line L1 when the symmetrical line L1 passes over the protective cover 31 in case that the protective cover 31 is assembled to the sensor 21. In addition, a width W7 between the inner side face and the outer side face of the arm portion 35a is slightly smaller than the width W3 of the gap C1.

A linear projection 35c is formed on the outer side face of the arm portion 35a. A width W8 from the reference line L2 to a tip end face of the projection 35C is slightly larger than a width (W1/2) from the symmetrical line L1 to the tip end face of the seat portion 22b of the holder portion 22 (i.e. plane facing the upper rail 14 when the sensor 21 is assembled to the upper rail 14).

Accordingly, when each engaging hook 35 is inserted into each gap C1 under the condition that the protective cover 31 is assembled to the sensor 21, the projection 35c is then pressed and squashed to thereby fill a gap between the outer side face of the arm portion 35a and the plane of the upper rail 14 facing to the projection 35C. Then, the looseness between the protective cover 31 and the upper rail 14 may be prevented. In this case, the protective cover 31 is held by the hook portion 35b inclining to the upper rail 14 side relative to the arm portion 35a, being pressed to be in contact with the upper rail 14 and the sensor 21.

As shown in FIG. 3A, projections 36 are formed on both corners on the end portion of the reduced width portion 32b, extending in outward direction (i.e. upper rail 14 side). A width W9 from the reference line L2 to a tip end of the projection 36 is slightly larger than the width (W1/2) from the symmetrical line L1 to the tip end face of the seat portion 22b of the holder portion 22. Therefore, when each engaging hook 35 is inserted into the gap C1 under the condition that the protective cover 31 is assembled to the sensor 21, the projection 36 is then pressed and squashed, thereby filling the gap between a tip end face of the top board portion 32 (reduced width portion 32b) and the plane of the upper rail 14 facing the board portion 32. Then, the looseness between the protective cover 31 and the upper rail 14 may be prevented.

A first stopper wall 37 is formed between an inner wall face of the reduced width portion 32b and the inner side face of the arm portion 35a. The first stopper wall 37 extends towards the inclined board portion 33 side via a stepped portion 37a. A distance from an upper face of the top board portion 32 to a lower face of the first stopper wall 37 (stepped portion 37a) is set to be a predetermined height H1. The first stopper wall 37 determines the position of the protective cover 31 relative to the sensor 21 in the height direction by the stepped portion 37a being in contact with the upper face of the holder portion 22 in case that the protective cover 31 is assembled to the sensor 21.

A plurality of second stopper walls 38 (two stopper walls according to the present embodiment) are formed on the inclined board portion 33 with keeping a predetermined interval. As shown in FIG. 4A, which is a view of the protective cover 31 when viewed from a backside, i.e. the sensor 21 side, the second stopper walls 38 are alternately arranged with the engaging hooks 35. As shown in FIG. 3B, each second stopper wall 38 extends towards the engaging hook 35 side via a stepped portion 38a. A distance from the upper face of the top board portion 32 to a lower face of the second stopper wall 38 (stepped portion 38a) is set to be the height H1. The second stopper wall 38 also determines the position of the protective cover 31 relative to the sensor 21 in the height direction by the stepped portion 38a being in contact with the upper face of the holder portion 22 in case that the protective cover 31 is assembled to the sensor 21.

Accordingly, the position of the protective cover 31 relative to the sensor 21 is determined by assuring the height H1 from the upper face of the top board portion 32 to the upper face of the holder portion 22 by the stepped portions 37a and 38a of the first stopper wall 37 and the second stopper portion 38 respectively being in contact with the upper face of the holder portion 22. The height H1 is set as an appropriate value such that the detection performance of the sensor 21 is not affected even if a foreign object of magnetic material is placed on the top board portion 32.

A width W10 from the reference line L2 to the inner wall face of the sidewall portion 34 is slightly larger than the width (W1/2) from the symmetrical line L1 to the tip end face of the seat portion 22b.

A plurality of engaging walls 39 are formed on the side wall portion 34 with keeping a predetermined interval. As shown in FIG. 4A, the engaging walls 39 are arranged on lower side of the second stopper walls 38 and between which the engaging hooks 35 are arranged. Since the engaging walls 39 are arranged on outer side of the engaging hooks 35, the engaging walls 39 are prevented from interfering with the seat portion 22b and the positioning pin 22c in case that the protective cover 31 is assembled to the sensor 21.

As shown in FIG. 3B, each engaging wall 39 extends from a base side thereof (i.e. the side wall face 34 side) towards the engaging hook 35 side in a stepped manner via a first stepped portion 39a and a second stepped portion 39b. A distance from the reference line L2 to a boundary portion between the first stepped portion 39a and the second stepped portion 39b is set to be a width W6. That is, a center defined between the inner side face of the arm portion 35a of the engaging hook 35, and the boundary portion between the first stepped portion 39a and the second stepped portion 39b is identical to the reference line L2. A distance from the boundary portion between the first stepped portion 39a and the second stepped portion 39b, and the outer wall face of the sidewall portion 34 is set to be a width W11. Further, a width W12 from the reference line L2 to a tip end face of the engaging wall 39 is larger than the width W5 defined on the lower side of the holder portion 22 in FIG. 2B. Furthermore, a distance from the lower face of the second stopper wall 38 (stepped portion 38a) to the second stepped portion 39b of the engaging wall 39 is set to be a predetermined height H2. The height H2 is slightly larger than a height H3 from the upper face of the holder portion 22 to the stepped portion 22d.

The protective cover 31 is prevented from pulling out from the sensor 21 by the second stepped portion 39b of the engaging wall 39 to engage with the land portion 22e (stepped portion 22d) of the holder portion 22 in case that the protective cover 31 is assembled to the sensor 21. At this time, the position of the protective cover 31 relative to the upper rail 14 is determined by assuring the width W11 from the outer wall face of the sidewall portion 34 and the tip end face of the land portion 22e. The width W11 is set as an appropriate value such that the detection performance of the sensor 21 is not affected even if the foreign object of magnetic material attaches to the sidewall portion 34.

As shown in FIG. 4A, a plurality of third stopper walls 40 (two stopper walls according to the present embodiment) are formed on the side wall portion 34, extending in the form of plate, towards the engaging hook 35 side from the lower side of the engaging wall 39. Then, as shown in FIG. 3B, a width W13 from the reference line L2 to a tip end face of the third stopper wall 40 is smaller than the width W5 defined on the lower side of the holder portion 22 in FIG. 2B. In addition, a height H4 from the lower face of the second stopper wall 38 (stepped portion 38a) to an upper face of the third stopper wall 40 is slightly larger than a height H5 from the upper face to the lower face of the holder portion 22 as shown in FIG. 2B. The protective cover 31 is prevented from pulling out from the sensor 21 by the third stopper wall 40 extending so as to support the lower face of the holder portion 22 in case that the protective cover 31 is assembled to the sensor 21.

A distance from the upper face of the third stopper wall 40 to a lower end of the sidewall portion 34 is set to be a height H6. Therefore, the sensor 21 equipped with the protective cover 31 is covered from the outside by the sidewall portion 34 extending downward with the height H6 from the lower face of the holder portion 22. The height H6 is set as an appropriate value such that the foreign object of magnetic material is prevented from entering into the sensor 21 side from the obliquely lower side after dropped on and bounced from the vehicle floor, especially prevented from attaching to the lower face of the sensor 21.

Accordingly, the position of the protective cover 31 relative to the sensor 21 is determined by the engaging hooks 35, the first stopper walls 37 (stepped portions 37a), the second stopper walls 38 (stepped portions 38a), the engaging walls 39 and the third stopper walls 40 surrounding corners of the holder portion 22. The protective cover 31 is then prevented from being pulled out from the sensor 21. At this time, the second stepped portions 39b engage with the land portion 22e (stepped portions 22d) while the second stopper walls 38 (stepped portions 38a) and the engaging walls 39 engage with the land portion 22e, thereby preventing the protective cover 31 from being pulled out from the sensor 21.

Figure 4B:
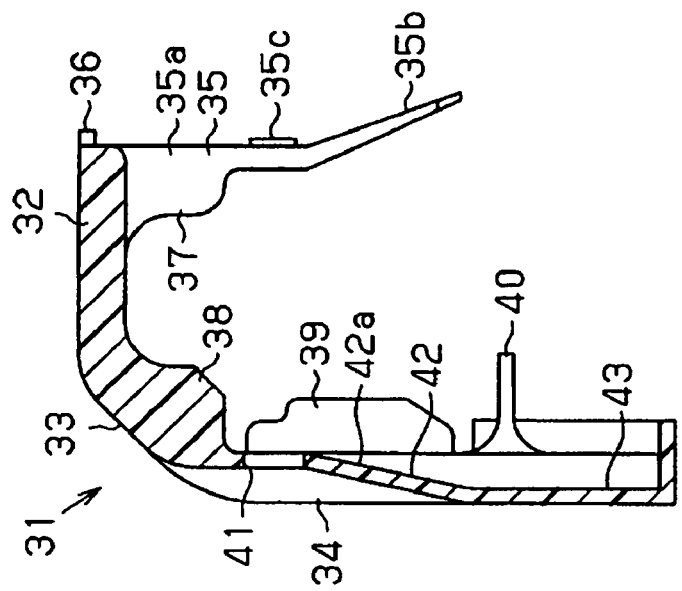
FIG. 4B is a cross-sectional view taken along the line B-B of FIG. 4A.
Figure 4A:
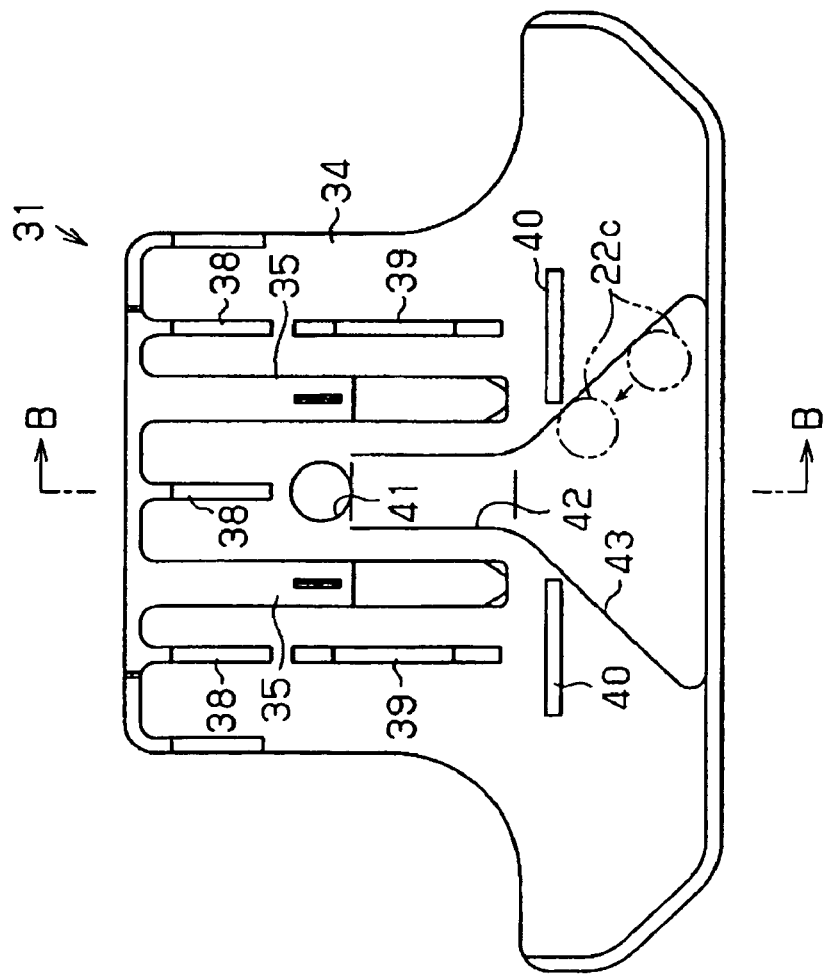
FIG. 4A is a side view of the protective cover when viewed from a backside.

As shown in FIGS. 4A and 4B, an engaging bore 41 is formed on the side wall portion 34 on the inclined board portion 33 side for being penetrated corresponding to the positioning pin 22c used in case of assembling the protective cover 31 to the sensor 21. The protective cover 31 is positioned and held to the sensor 21 by the positioning pin 22c, which is not used for positioning the sensor 21 relative to the upper rail 14, being inserted into the engaging bore 41.

Figure 5A:
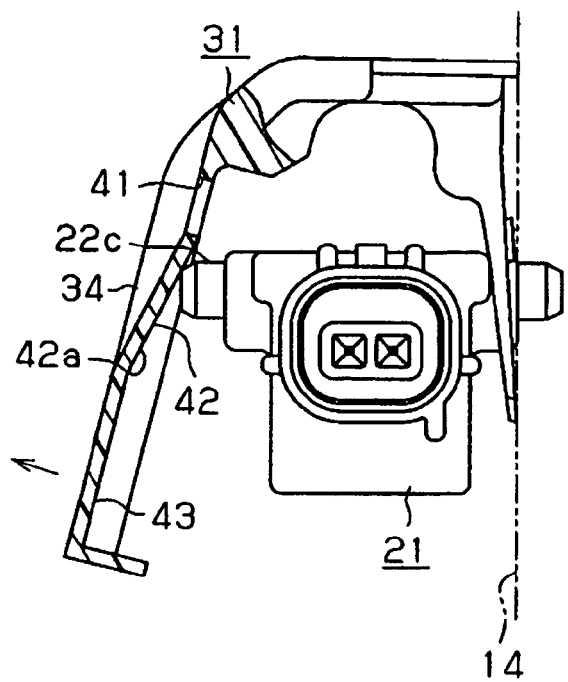
FIG. 5A is a cross-sectional view of the protective cover assembled to the sensor.
Figure 5B:
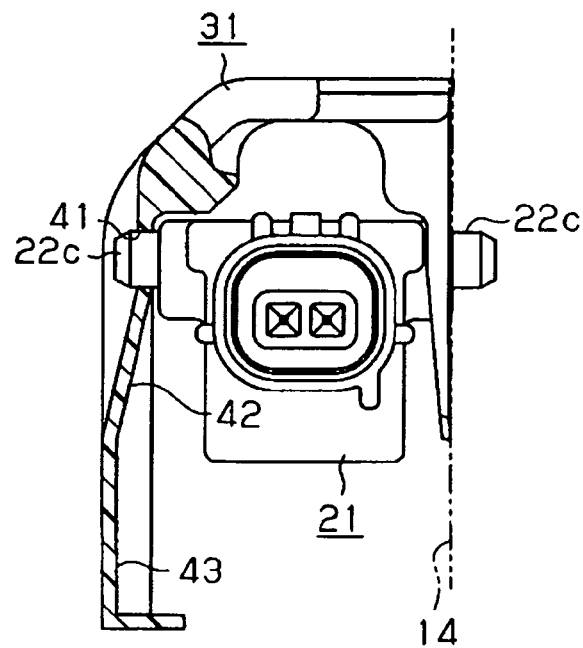
FIG. 5B is a cross-sectional view of the protective cover assembled to the sensor.

A first concave portion 42 downwardly extending from the lower side of the engaging bore 41, and a second concave portion 43 connected to the first concave portion 42 and downwardly extending therefrom are formed on the sidewall portion 34. As shown in FIG. 4B, a guide face 42a is formed on an inner face of the first concave portion 42, outwardly and gradually inclining in the downward direction. The first concave portion 42 is provided for guiding the engaging bore 41 to the positioning pin 22c when the protective cover 31 is assembled to the sensor 21. That is, as shown in FIGS. 5A and 5B, when the protective cover 31 is moved downward to be assembled to the sensor 21, the inner wall face of the sidewall portion 34 interferes with the positioning pin 22c. Thus, the protective cover 31 is elastically deformed by being pushed out, i.e. pushed in a direction apart from the sensor 21, by the positioning pin 22c. At this time, the protective cover 31 is pushed out by the positioning pin 22c in contact with the guide face 42a when the protective cover 31 is assembled to the sensor 21. Then, the engaging bore 41 is guided to the positioning pin 22c. In this case, the inner wall face of the first concave portion 42 is in contact with the positioning pin 22c, thereby correcting the position deviation of the protective cover 31. The protective cover 31 is held to the sensor 21 by the positioning pin 22c being inserted into the engaging bore 41 that is guided to the positioning pin 22c.

As shown in FIG. 4A, the second concave portion 43 has a substantially triangular shape in section that gradually expands in the downward direction. The second concave portion 43 guides the positioning pin 22c to the first concave portion 42 if the first concave portion 42 is deviated in the longitudinal direction (horizontal direction in FIG. 4A) relative to the positioning pin 22c when the protective cover 31 is temporarily assembled to the sensor 21. That is, if the first concave portion 42 is deviated in the longitudinal direction relative to the positioning pin 22c as mentioned above in case that the protective cover 31 is temporarily assembled to the sensor 21, the inner wall face of the second concave portion 43 is in contact with the positioning pin 22c, thereby gradually guiding the first concave portion 42 to the positioning pin 22c along with the protective cover 31 being assembled to the sensor 21. FIG. 4A shows a state in which the positioning pin 22c is guided to the first concave portion 42 based on the protective cover 31 (second concave portion 43). However, in the real situation, the first concave portion 42 of the protective cover 31 is guided to the positioning pin 22c based on the positioning pin 22c.

How to assemble the protective cover 31 to the sensor 21 is explained as follows. First, the protective cover 31 is arranged on the upper side of the sensor 21 that is mounted to the upper rail 14. Then, the engaging hooks 35 of the protective cover 31 are inserted from each tip end side thereof (hook portion 35b) into the respective gaps C1 formed on both sides of the seat portion 22b in the longitudinal direction. At this time, the protective cover 31 is elastically deformed by being pushed out, i.e. pushed in a direction in which the sidewall portion 34 of the protective cover 31 is apart from the sensor 21, and then the positioning pin 22c provided on the opposite side to the upper rail 14 is arranged within the second concave portion 43. When the engaging hooks 35 are further inserted into the respective gaps C1 under the above condition, the protective cover 31 is pushed out by the inner wall face of the second concave portion 43 being pressed against the positioning pin 22c. Then, the first concave portion 41 is guided to the positioning pin 22c. When the engaging hooks 35 are further inserted into the respective gaps C1, the protective cover 31 is gradually pushed out by the first concave portion 42 (guide face 42a) being pressed against the positioning pin 22c. Then the engaging bore 41 is guided to the positioning pin 22c, which is then inserted into the engaging bore 41. At this time, the pressing force of the positioning pin 22c towards the first concave portion 42 is released, thereby elastically returning the protective cover 31 to an original L-shape.

The protective cover 31 is held to the sensor 21 under the condition that the positioning pin 22c is positioned within the engaging bore 41, and the engaging hooks 35, the first stopper walls 37 (stepped portions 37a), the second stopper walls 38 (stepped portions 38a), the engaging walls 39 and the third stopper walls 40 surround and engage with the corner portions of the holder portion 22. In addition, the second stepped portions 39b engage with the land portion 22e (stepped portions 22d) under the condition that the second stopper walls 38 (stepped portions 38a) and the engaging walls 39 engage with the land portion 22e of the holder portion 22 to thereby hold the protective cover 31 to the sensor 21 and also prevent the protective cover 31 from being pulled out from the sensor 21.

In this case, the protective cover 31 is also prevented from being pulled out from the sensor 21 and held thereto due to the reaction force or friction force generated when the hook portions 35b of the engaging hooks 35 inserted into the respective gaps C1 are pressed against the upper rail 14 and the sensor 21.

In addition, the protective cover 31 is assembled to the sensor 21 while the projections 35c and 36 are pushed and squashed by being in contact with the upper rail 14, thereby filling the gap between the engaging hooks 35 and the plane of the upper rail 14 facing the engaging hooks 35. The looseness between the protective cover 31 and the upper rail 14 may be prevented.

Further, in case that the protective cover 31 is assembled to the sensor 21, the upper face of the top board portion 32 is separated from the lower face of the second stopper wall 38, i.e. the upper face of the sensor 21 by the height H1. Thus, even if the foreign object of magnetic material is placed on the top board portion 32, the detection performance of the sensor 21 may be prevented from deteriorating. In addition, the outer wall face of the sidewall portion 34 is separated from the border portion between the first stepped portion 39a and the second stepped portion 39b, i.e. the outer side face of the sensor 21 by the width W11. Thus, even if the foreign object of magnetic material attaches to the sidewall portion 34, the detection performance of the sensor 21 may be also prevented from deteriorating.

Figure 6A:
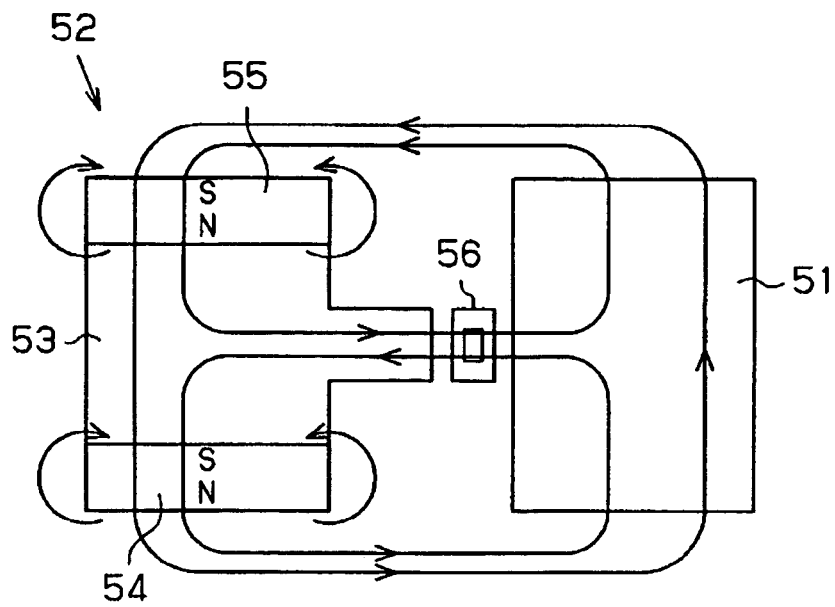
FIG. 6A is a view for explaining a magnetic circuit formed in the sensor.
Figure 6B:
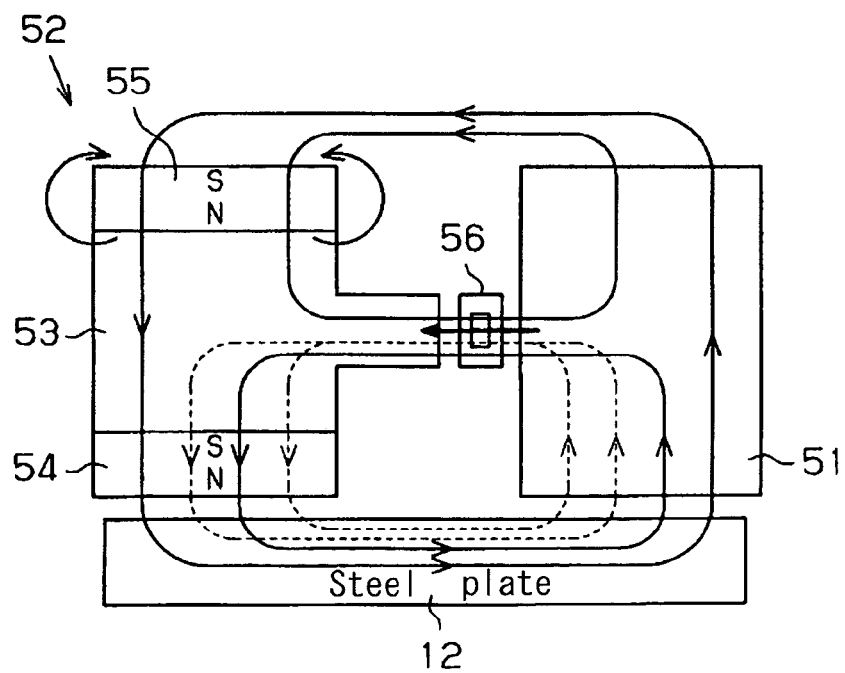
FIG. 6B is a view for explaining the magnetic circuit formed in the sensor.
Figure 7A:
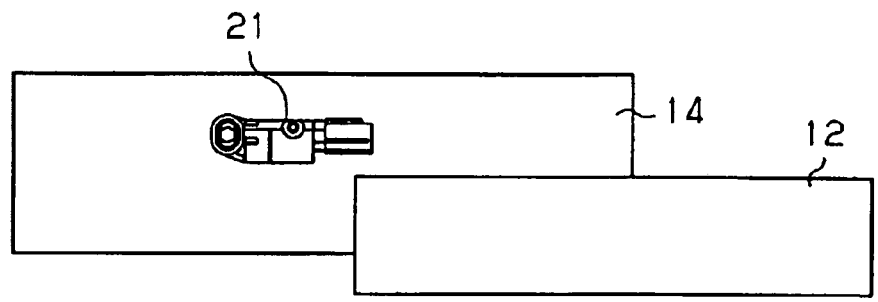
FIG. 7A is a view showing a position of an upper rail in accordance with FIG. 6A.
Figure 7B:
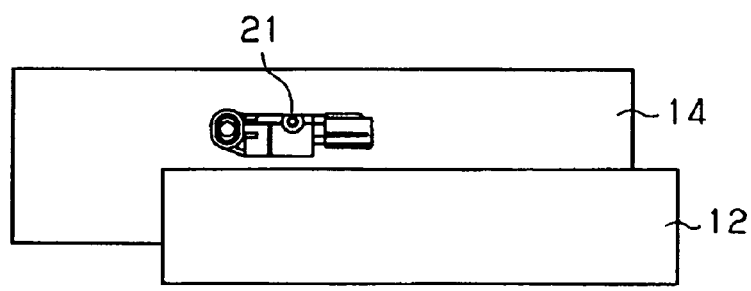
FIG. 7B is a view showing a position of the upper rail in accordance with FIG. 6B.

Next, the detection principle of the magnetic force detecting portion accommodated in the sensor 21 (holder portion 22) and the seat position is explained referring to FIGS. 6A, 6B, 7A and 7B. FIGS. 6A and 6B are views showing magnetic circuit formed within the holder portion 22. FIGS. 7A and 7B are views showing the position of the upper rail 14 corresponding to the magnetic circuit of FIGS. 6A and 6B.

As shown in FIGS. 6A and 6B, a substantially block-shaped, first yoke 51 is accommodated in the holder portion 22 on one side thereof (i.e. connecter portion 23 side). Meanwhile, a substantially block-shaped magnetic member 52 is accommodated in the holder portion 22 on the other side thereof (i.e. sensor fitting portion 24 side). The magnetic member 52 includes a second yoke 53 penetrating through a center portion towards the first yoke 51, a first magnet 54 and a second magnet 55 provided on upper and lower sides of the second yoke 53 respectively. The magnetic directions of the first magnet 54 and the second magnet 55 are identical with each other, being perpendicular to faces through which the first and second magnets 54 and 55, and the second yoke 53 are in contact.

In addition, a magnetoelectric conversion element 56 is arranged within a gap formed between the first yoke 51 and the second yoke 53. The magnetoelectric conversion element 56 is connected to the connecting terminals 25 and 26 via an element board (not shown). The magnetoelectric conversion element 56 generates the current via the element board in response to the magnetic force applied to the magnetoelectric conversion element 56 and output the current from the connecting terminals 25 and 26.

Precisely, as shown in FIG. 7A, the upper rail 14 is provided on one side relative to the lower rail 12 (i.e. left side of FIG. 7A), projecting towards one side relative to the lower rail 12, and thus the lower rail 12 is not provided on the lower side of the sensor 21. This state is caused when the seat is positioned relatively frontward in the vehicle since the upper rail 14 is slidably moved in the vehicle frontward direction relative to the lower rail 12, for example. As shown in FIG. 6A, the magnetic circuit in accordance with the above-mentioned state is symmetrically formed in the vertical direction except for each polarity of the first magnet 54 and the second magnet 55. Thus, the magnetic fields generated by the first magnet 54 and the second magnet 55 respectively are symmetrically formed in the vertical direction, though the directions of the respective magnetic fields are opposite to each other. The magnetoelectric conversion element 56 arranged at the center portion of the magnetic member 52 for corresponding to the second yoke 53 receives the magnetic force, which is balanced out and thus defined as zero value. A point at which the magnetic forces of a north pole and a south pole are balanced out and thus the magnetic force is defined as zero value is called Null point. Therefore, the current in response to the magnetic force of zero value applied to the magnetoelectric conversion element 56 is generated and output via the element board.

In FIG. 7B, the upper rail 14 is arranged on the other side, i.e. the lower rail 12 side (right side of FIG. 7B). The lower rail 12 is arranged on the lower side of the sensor 21. This state is caused when the seat is positioned relatively rearward in the vehicle since the upper rail 14 is slidably moved in the vehicle rearward direction relative to the lower rail 12, for example. As shown in FIG. 6B, according to the magnetic circuit in accordance with the above-mentioned state, a steel plate (lower rail 12) is arranged on the lower side of the first yoke 51 and the magnetic member 52, thereby breaking down the balance of aforementioned magnetic force. Then, the magnetoelectric conversion element 56 receives the magnetic force of a value in response to the balance being broken down. Accordingly, the current in response to the magnetic force applied to the magnetoelectric conversion element 56 is generated and output via the element board.

The current output from the element board is read in a controller (not shown) and then the position of the upper rail 14 (sensor 21) relative to the lower rail 12, i.e. the seat position, is detected. The controller detects the seat position in two states, i.e. relatively frontward and relatively rearward in the vehicle. The detected seat position is sent to an air bag device (not shown) and used for switching the deployment force of the air bag, for example.

According to the aforementioned embodiment, the sensor 21 is covered by the protective cover 31 so that the detection performance of the sensor 21 is prevented from deteriorating due to the foreign object of magnetic material such as an iron piece and magnetic attaching in the vicinity of the sensor 21.

In addition, according to the aforementioned embodiment, the top board portion 32 surrounding the sensor 21 is provided above the sensor 21 (holder portion 22) with keeping the height H1 (first predetermined distance). Thus, even if the foreign object of magnetic material such as the iron piece and magnet attaches to the top board portion 32, the effect by the magnetic material may be eased because of the height H1. In addition, the sidewall portion 34 surrounding the sensor 21 is provided away from the sensor 21 (land portion 22e) with keeping the width W11 (second predetermined distance). Thus, even if the foreign object of magnetic material attaches to the sidewall portion 34, the effect by the magnetic material may be also eased because of the width W11.

Further, the sidewall portion 34 extends downward by the height H6 from the sensor 21. Thus, the magnetic material bounced from the vehicle floor is prevented from entering into the sensor 21 side.

According to the aforementioned embodiment, the protective cover 31 is first elastically deformed by being pressed against the outer face of the sensor 21 (positioning pin 22c). Then the protective cover 31 is elastically returned to the original shape thereof and held to the sensor 21 by the protective cover 31 engaging with the corner portions of the holder portion 22 via the engaging hooks 35, the first stopper walls 37 (stepped portions 37a), the second stopper walls 38 (stepped portions 38a), the engaging walls 39 and the third stopper walls 40 all consisting of the engaging portion of the protective cover 31, and at the same time, engaging with the land portion 22e of the holder portion 22 via the second stopper walls 38 (stepped portions 38a) and the engaging walls 39 also consisting of the engaging portion of the protective cover 31. Thus, the protective cover 31 may be assembled to the sensor 21 by a simple process that the engaging portion of the protective cover 31 engages with the outer face of the sensor 21 while the protective cover 31 is elastically deformed by being pressed against the outer face of the sensor 21. A tightening member such as a bolt and nut may not be additionally required or additional process such as riveting may not be required for assembling the protective cover 31 to the sensor 21.

According to the aforementioned embodiment, the protective cover 31 may be held to the sensor 21 by the reaction force and the friction force generated when the engaging hooks 35 inserted into the respective gaps C1 are pressed against the upper rail 14 and the sensor 21.

According to the aforementioned embodiment, the protective cover 31 has the symmetrical structure so that the protective cover 31 can be assembled to the sensor 21 that has been mounted to either side of the seat slide portion (upper rail 14). Therefore, the protective cover 31 is not required to be individually designed depending on which side of the upper rail 14 the sensor 21 is assembled to, thereby increasing versatility of the protective cover 31.

According to the aforementioned embodiment, an additional positioning pin 22c that is not used for positioning the sensor 21 relative to the seat slide portion (upper rail 14) is provided for being inserted into the engaging bore 41 to engage therewith, thereby holding the protective cover 31 to the sensor 21.

According to the aforementioned embodiment, the protective cover 31 may be assembled to the sensor 21 after the sensor 21 is mounted to the seat slide portion (upper rail 14). In addition, the protective cover 31 is firmly assembled to the sensor 21 due to the simultaneous use of the elastic engaging structure, the engaging structure between the positioning pin 22c and the engaging bore 41, and the pressed connection structure of the engaging hooks 35 within the respective gaps C1.

According to the aforementioned embodiment, the sensor 21 detects the position of the lower rail 12 without pinching the lower rail 12 between the first and second magnets 54 and 55, and the magnetoelectric conversion element 56. Thus, the sensor 21 is not required to extend so as to pinch the lower rail 12 between the first and second magnets 54 and 55, and the magnetoelectric conversion element 56. Thus, the mounting performance of the sensor 21 may be increased.

The present invention is not limited to the above embodiment and may be changed as follows.

Figure 8:
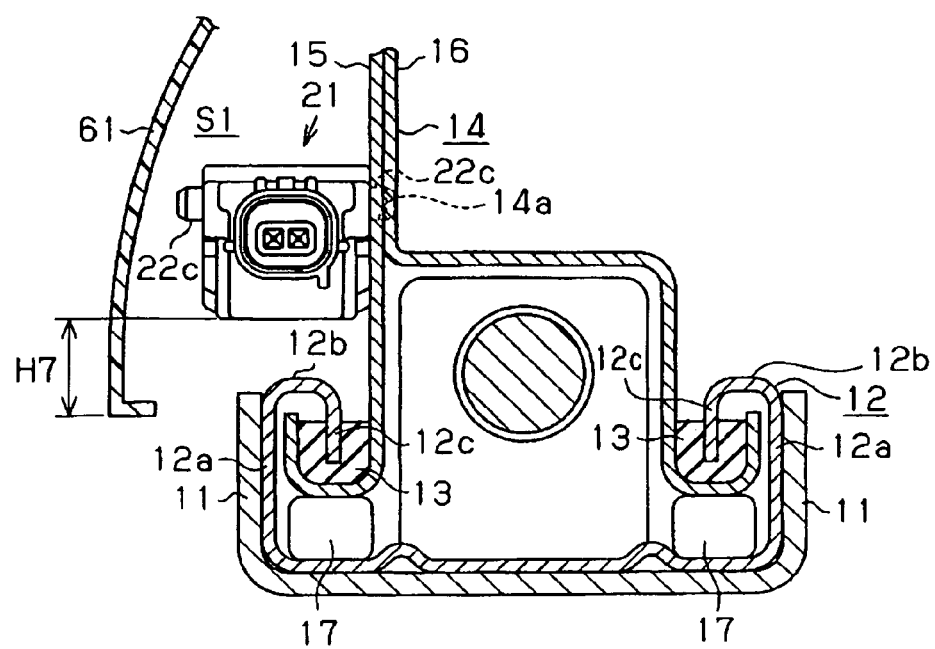
FIG. 8 is a cross-sectional view showing another embodiment of the present invention.

The protective cover 31 is separately provided to protect the sensor 21 according to the present embodiment. However, as shown in FIG. 8, the sensor 21 may be arranged and mounted within an area S1 in which the outer side of the sensor 21 is covered by an existing shield cover 61 as a decorative member of a seat cushion portion of the vehicle seat. With this change, the detection performance of the sensor 21 is also prevented from deteriorating even if the foreign object of magnetic material such as the iron piece and magnet attaches to the vicinity of the sensor 21 by surrounding the sensor 21 with the shield cover 61.

In this case, the sensor 21 is arranged and mounted within the area S1 such that a predetermined height H7 is assured from the lower face of the sensor 21 (holder portion 22) to a lower end of the shield cover 61. Then, the sensor 21 is covered by the shield cover 61 downwardly extending by the height H7 from the lower face of the holder portion 22. The height H7 is set to an appropriate value by which the magnetic material dropped on and bounced from the vehicle floor is prevented from entering into the sensor 21 side from the obliquely lower side, especially prevented from attaching to the lower face of the sensor 21. If it is difficult for the sensor 21 to be arranged and mounted within the area S1 formed by the shield cover 61 for assuring the detection performance of the sensor 21, the shield cover 61 may further extend downwardly by design change.

Number of engaging hooks 35 may be one or more than two. In addition, number of first stopper walls 37 may be increased or decreased depending on the number of engaging hooks 35. Alternatively, the first stopper wall 37 may be selectively formed on any of the plurality of engaging hooks 35.

The engaging hook 35 and the first stopper wall 37 may be separately formed on different positions from each other instead of being continuously formed as in the present embodiment. In addition, number of second stopper walls 38 may be one, two, or more than two.

Number of engaging walls 39 may be one or more than two. In addition, number of third stopper walls 40 may be one or more than two.

The protective cover 31 is formed by resin material according to the present embodiment. However, the protective cover 31 may be formed by any material other than the ferromagnetic material. In addition, the sensor 21 is fastened to the upper rail 14 via the bolt according to the present embodiment. However, the sensor 21 may be engaged with or riveted to the upper rail 14.

The sensor 21 is assembled to the upper rail 14 for detecting the lower rail 12 according to the present embodiment. However, the sensor 21 may be assembled to the lower rail 12 for detecting the upper rail 14. In addition, the present embodiment is not limited to the structure that the sensor 21 directly detests the lower rail 12 or the upper rail 14. For example, the sensor 21 may detect a detected board provided on the rail to be detected. Further, the sensor 21 may be provided on the rail via a supporting member as a separate part.

The structure of the magnetic circuit according to the present embodiment is an example and may be changed accordingly. The present embodiment is employed in the seat slide portion relatively moving in the linear direction. However, the present invention may be employed in the seat slide portion for a face-to-face revolving seat that rotates in a curve.

The device for detecting the occupant position in the vehicle is explained according to the present embodiment. However, the device may detect the load on the seat for detecting a weight of the occupant. The point is that the device should include the magnetic sensor for detecting a required seat status. In order to mount the magnetic sensor for detecting the seat status, the addition of change such as for vertically dividing a part of the seat slide portion (upper rail 14) may be no problem.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat status detecting device comprising:
a seat slide portion provided at a seat;
a magnetic sensor provided at the seat slide portion for detecting a seat status by way of a steel plate, the magnetic sensor comprising a first magnet, a second magnet, and a detection element, the detection element being arranged at a portion between the first magnet and the second magnet for detecting a change in the balance of magnetic force between the first and second magnets;
a protective cover assembled onto the magnetic sensor for surrounding the magnetic sensor, the protective cover including a first wall portion provided above the magnetic sensor while keeping a first predetermined distance therefrom and a second wall portion provided on a side of the magnetic sensor while keeping a second predetermined distance therefrom and extending downwardly relative to the magnetic sensor for surrounding the magnetic sensor, the protective cover preventing foreign objects from deteriorating performance of the magnetic sensor; wherein when the seat slide portion moves in a predetermined direction, the first magnet is arranged close to the steel plate that is positioned opposite to the detection element.

2. A seat status detecting device according to claim 1, wherein the protective cover includes an engaging portion engaging with an outer face of the magnetic sensor, and is held to the magnetic sensor after being elastically deformed by being pressed against the outer face of the magnetic sensor and then returned to an original shape of the protective cover by the engaging portion engaging with the outer face of the magnetic sensor.

3. A seat status detecting device according to claim 2, wherein the protective cover includes an engaging hook being inserted into a gap formed between the seat slide portion and the magnetic sensor, and being pressed against the seat slide portion and the magnetic sensor.

4. A seat status detecting device according to claim 3, wherein the magnetic sensor has a symmetrical structure for being assembled to one side or the other side of the seat slide portion, and the protective cover has a symmetrical structure for being assembled to the magnetic sensor assembled to the one side or the other side of the seat slide portion.

5. A seat status detecting device according to claim 4, wherein the magnetic sensor includes a pair of positioning pins, one of which is inserted into the one side or the other side of the seat slide portion so that a position of the magnetic sensor relative to the seat slide portion is determined, and the other one of which, not inserted into the seat slide portion, is inserted into an engaging bore formed on the protective cover.

6. A seat status detecting device according to claim 5, wherein the second wall portion includes a first concave portion downwardly extending from a lower side of the engaging bore and including a guide face outwardly and downwardly inclining with which the positioning pin is in contact, and a second concave portion connected to the first concave portion and downwardly extending therefrom.

7. A seat status detecting device according to claim 3, wherein the engaging hook includes an arm portion extending substantially in parallel with the second wall portion, and a hook portion extending and bending from an end portion of the arm portion in an obliquely outward direction towards the seat slide portion.

8. A seat status detecting device comprising:
a seat slide portion provided at a seat;
a magnetic sensor provided at the seat slide portion for detecting a seat status;
a protective cover assembled to the magnetic sensor for surrounding the magnetic sensor;
the protective cover including a first wall portion provided above the magnetic sensor with keeping a first predetermined distance therefrom and a second wall portion provided on a side of the magnetic sensor with keeping a second predetermined distance therefrom and extending downwardly relative to the magnetic sensor for surrounding the magnetic sensor;
the protective cover including an engaging portion engaging with an outer face of the magnetic sensor, and is held to the magnetic sensor after being elastically deformed by being pressed against the outer face of the magnetic sensor and then returned to an original shape of the protective cover by the engaging portion engaging with the outer face of the magnetic sensor; and
the protective cover including an engaging hook being inserted into a gap formed between the seat slide portion and the magnetic sensor, and being pressed against the seat slide portion and the magnetic sensor.

* * * * *

UNITED STATES PATENT AND TRADEMARK OFFICE
CERTIFICATE OF CORRECTION

PATENT NO.         : 7,400,947 B2
APPLICATION NO. : 10/894119
DATED                 : July 15, 2008
INVENTOR(S)       : Hirofumi Endo et al.

It is certified that error appears in the above-identified patent and that said Letters Patent is hereby corrected as shown below:

Please add the following inventors' names that were omitted from the patent grant.

| Name | Residence | Nationality |
|---|---|---|
| Hiroshi TAMURA, | Toyota-shi, Aichi-ken, JAPAN | Japan |
| Yasunori HASEGAWA | Kasugai-shi, Aichi-ken, JAPAN | Japan |
| Masato OHCHI | Kasugai-shi, Aichi-ken, JAPAN | Japan |
| Masaki FUKUZAWA | Kasugai-shi, Aichi-ken, JAPAN | Japan |

Signed and Sealed this

Twenty-fourth Day of February, 2009

JOHN DOLL
*Acting Director of the United States Patent and Trademark Office*